United States Patent
Haswell

(10) Patent No.: US 11,232,041 B2
(45) Date of Patent: *Jan. 25, 2022

(54) MEMORY ADDRESSING

(71) Applicant: Micron Technology, Inc., Boise, ID (US)

(72) Inventor: Jonathan M. Haswell, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/739,401

(22) Filed: Jan. 10, 2020

(65) Prior Publication Data

US 2020/0151110 A1 May 14, 2020

Related U.S. Application Data

(63) Continuation of application No. 15/664,252, filed on Jul. 31, 2017, now Pat. No. 10,534,718.

(51) Int. Cl.
G06F 12/1009 (2016.01)
G06F 12/02 (2006.01)
(Continued)

(52) U.S. Cl.
CPC ...... *G06F 12/1009* (2013.01); *G06F 12/0246* (2013.01); *G06F 12/1027* (2013.01);
(Continued)

(58) Field of Classification Search
None
See application file for complete search history.

(56) References Cited

U.S. PATENT DOCUMENTS 7,251,653 B2 7/2007 Huang et al.
8,321,652 B2 11/2012 Hinz
(Continued)

FOREIGN PATENT DOCUMENTS

| CN | 104641356 A | 5/2015 |
|---|---|---|
| CN | 104679446 A | 6/2015 |
| WO | 2014043459 A1 | 3/2014 |

OTHER PUBLICATIONS

First Office Action from related Chinese Application No. 201880049529.9, dated Aug. 21, 2020, 8 pages.
(Continued)

*Primary Examiner* — Gary W. Cygiel
(74) *Attorney, Agent, or Firm* — Brooks, Cameron & Huebsch, PLLC

(57) ABSTRACT

An example apparatus for memory addressing can include an array of memory cells. The apparatus can include a memory cache configured to store at least a portion of an address mapping table. The address mapping table can include a number of regions corresponding to respective amounts of logical address space of the array. The address mapping table can map translation units (TUs) to physical locations in the array. Each one of the number of regions can include a first table. The first table can include entries corresponding to respective TU logical address of the respective amounts of logical address space, respective pointers, and respective offsets. Each one of the number of regions can include a second table. The second table can include entries corresponding to respective physical address ranges of the array. The entries of the second table can include respective physical address fields and corresponding respective count fields.

20 Claims, 5 Drawing Sheets

(51) Int. Cl.
  *G06F 12/1027* (2016.01)
  *G06F 12/0802* (2016.01)
(52) U.S. Cl.
  CPC ...... *G06F 12/0802* (2013.01); *G06F 2212/60* (2013.01); *G06F 2212/65* (2013.01); *G06F 2212/7201* (2013.01)

(56) References Cited

U.S. PATENT DOCUMENTS

| | | | |
|---|---|---|---|
| 8,543,792 | B1 | 9/2013 | Glasco et al. |
| 8,838,937 | B1 * | 9/2014 | Katz ................ G06F 12/0246 711/216 |
| 9,229,876 | B2 | 1/2016 | Slepon |
| 2009/0198952 | A1 | 8/2009 | Khmelnitsky et al. |
| 2010/0030999 | A1 | 2/2010 | Hinz |
| 2010/0274961 | A1 | 10/2010 | Golla et al. |
| 2013/0067153 | A1 | 3/2013 | Tzeng |
| 2014/0325117 | A1 | 10/2014 | Canepa et al. |
| 2015/0127922 | A1 | 5/2015 | Camp et al. |
| 2016/0342509 | A1 | 11/2016 | Kotte et al. |
| 2017/0046273 | A1 | 2/2017 | Cohen |

OTHER PUBLICATIONS

Park, et al., "Hybrid TLB Coalescing: Improving TLB Translation Coverage under Diverse Fragmented Memory Allocations", ACM, pp. 444-456, 2017, 13 pages.

International Search Report and Written Opinion from related international application No. PCT/US2018/044000, dated Nov. 13, 2018, 15 pages.

Extended Search Report from related European Patent Application No. 18840416.4, dated Apr. 30, 2021, 8 pages.

* cited by examiner

MEMORY ADDRESSING

PRIORITY INFORMATION

This application is a continuation of U.S. application Ser. No. 15/664,252, filed on Jul. 31, 2017. The contents of which are incorporated herein by reference.

TECHNICAL FIELD

The present disclosure relates generally to semiconductor memory and methods, and more particularly, to memory addressing.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Flash memory devices can be utilized as volatile and non-volatile memory for a wide range of electronic applications. Flash memory devices typically use a one-transistor memory cell that allows for high memory densities, high reliability, and low power consumption. Flash memory devices often may have a "NAND" or "NOR" memory array architecture, so called for the logical form in which the basic memory cell configuration of each is arranged. Uses for flash memory include memory for solid state drives (SSDs), personal computers, personal digital assistants (PDAs), digital cameras, cellular telephones, portable music players (e.g., MP3 players), and movie players, among other electronic devices. Data, such as program code, user data, and/or system data, such as a basic input/output system (BIOS), are typically stored in flash memory devices.

A flash memory device may include a flash transition layer (FTL). An FTL can be used (e.g., during a programming operation performed on the flash memory device) to map a logical address associated with a data entry to a physical address in the flash memory. An FTL may include an address mapping table in the local memory of the flash memory device to perform the mapping operation. However, the size of (e.g., the amount of data stored in) address mapping tables used in previous FTL approaches may be fixed and more difficult to scale. Because the size of address mapping tables used in previous FTL approaches may be fixed, address mapping tables used in previous FTL approaches may not be adaptable to different types of flash memory devices. That is, previous FTL approaches may be used in only one type of flash memory device. Further, as the size of memory physically storing the data increases, the address mapping table may increase to a size that becomes difficult to manage.

DETAILED DESCRIPTION

Figure 1:
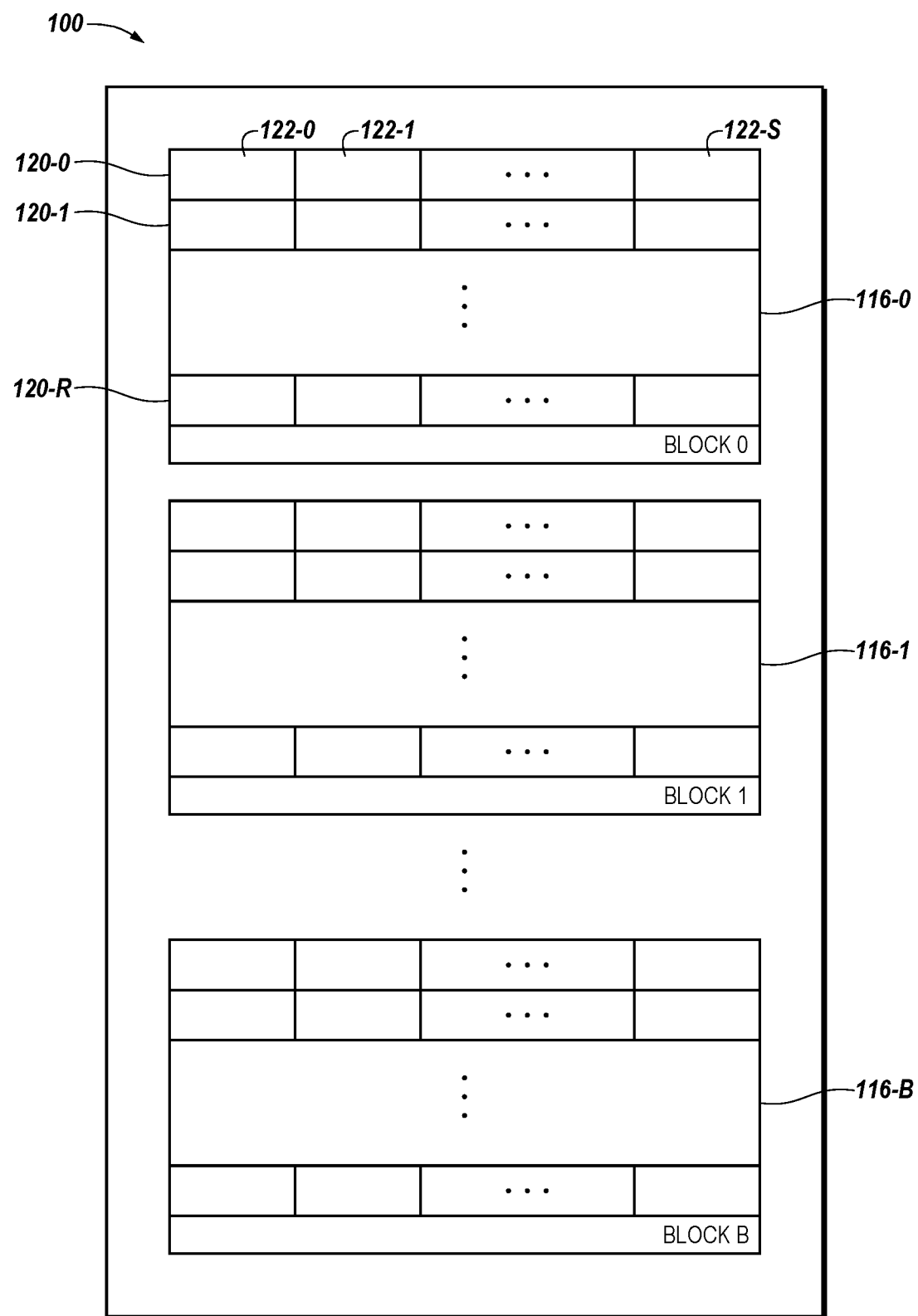
FIG. 1 illustrates a diagram of a portion of a memory array having a number of physical blocks in accordance with a number of embodiments of the present disclosure.

An example apparatus for memory addressing can include an array of memory cells. The apparatus can include a memory cache configured to store at least a portion of an address mapping table. The address mapping table can include a number of regions corresponding to respective amounts of logical address space of the array. The address mapping table can map translation units (TUs) to physical locations in the array. Each one of the number of regions can include a first table including entries corresponding to respective TU logical address. Each one of the number of regions can include a second table including entries corresponding to respective physical address ranges of the array. The entries of the first table can include respective pointers to a particular entry in the second table. The entries of the first table can include corresponding respective offsets indicating a location, within the physical address range corresponding to the particular entry in the second table, at which the physical data corresponding to the respective TU is stored. The entries of the second table can include respective physical address fields indicating a first physical address of the physical address range corresponding to the particular entry. The entries of the second table can include corresponding respective count fields indicating a quantity of TUs associated with the physical address range corresponding to the particular entry.

Embodiments of the present disclosure can include flash translation layers having tables (e.g., address mapping tables) that have variable sizes. That is, the size of (e.g., the amount of data stored in) the tables in flash translation layers of the present disclosure can change. Because the size of the tables in flash translation layers of the present disclosure can change, the tables may be adaptable to different types of flash memory devices. That is, flash translation layers in accordance with the present disclosure may be used in different types of flash memory devices.

Embodiments of the present disclosure can include address mapping tables that correlate a number of logical addresses of a translation unit (TU) with a single physical address in the address mapping table. This can be performed by associating a number of TUs that are written sequentially in a physical location starting at a particular physical address with a physical address entry that includes an entry pointing to the particular physical address. As an example, three entries corresponding to logical addresses of TUs can be associated with a single physical address. An offset associated with each of the three logical address entries can indicate where the TU is physically located in relation to the single physical address. As memory drives continue to increase in size, a method to reduce the size of an address mapping table can allow for larger memory drive sizes without a corresponding increase in the address mapping table used to map a logical address to a physical address. In this way, physical memory space used for storing address mapping tables can be minimized and the scalability of the address mapping tables can be increased.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designator "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 202 may reference element "02" in FIG. 2, and a similar element may be referenced as 302 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a diagram of a portion of a memory array 100 having a number of physical blocks in accordance with one or more embodiments of the present disclosure. Memory array 100 can be, for example, a NAND or NOR flash non-volatile memory array. However, embodiments of the present disclosure are not limited to a particular type of memory array. Further, although not shown in FIG. 1, one of ordinary skill in the art will appreciate that memory array 100 can be located on a particular semiconductor die, or constructed across multiple semiconductor dies, along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be single level cells and/or multilevel cells. As an example, the number of physical blocks in memory array 100 may be 128 blocks, 512 blocks, or 1,024 blocks, but embodiments are not limited to a particular multiple of 128 or to any particular number of physical blocks in memory array 100.

In the example shown in FIG. 1, each physical block 116-0, 116-1, . . . , 116-B includes memory cells which can be erased together as a unit (e.g., the cells in each physical block can be erased in a substantially simultaneous manner). For instance, the memory cells in each physical block can be erased together in a single erase operation.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block.

As one of ordinary skill in the art will appreciate, each row 120-0, 120-1, . . . , 120-R can include (e.g., store) one or more physical pages of data. A physical page refers to a unit of programming and/or sensing (e.g., a number of cells that are programmed and/or sensed together as a functional group of memory cells). In the embodiment shown in FIG. 1, each row 120-0, 120-1, . . . , 120-R stores one page of data. However, embodiments of the present disclosure are not so limited. For instance, in one or more embodiments of the present disclosure, each row can store multiple pages of data, with one or more even pages of data associated with even-numbered bit lines, and one or more odd pages of data associated with odd numbered bit lines. Additionally, for embodiments including multilevel cells, a physical page can be logically divided into an upper page and a lower page of data, with each cell in a row contributing one or more bits towards an upper page of data and one or more bits towards a lower page of data. In one or more embodiments, a memory array can include multiple physical blocks of memory cells and each physical block can be organized into multiple pages.

In one or more embodiments of the present disclosure, and as shown in FIG. 1, a page associated with a row can store data (e.g., after a programming operation) referred to as translation units (TUs) 122-0, 122-1, . . . , 122-S. Each TU 122-0, 122-1, . . . , 122-S can be stored in a portion of a page 120-0, 120-1, . . . , 120-R that corresponds to one or more logical portions of data. For example, a particular TU can correspond to a particular logical sector that is stored in a page, for example, as TUs 122-0 to 122-S are illustrated as being stored in page 120-0.

Each TU 122-0, 122-1, . . . , 122-S stored in page 120-0 will have a physical identifier, such as, for example, a physical block number (PBN), associated therewith. The PBN associated with a TU 122-0 to 122-S identifies the actual physical location of the sector within memory array 100. For example, a PBN can identify a CE #, LUN, plane, block, page, position, and/or status. Further, a number of PBNs can map onto a physical page of memory cells in memory array 100. For example, one, two or four PBNs can map onto a physical page, depending on what the type of memory array 100 is. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In this example, a TU is being used as a unit of translation, or a management unit for purposes of transferring and monitoring data. Each TU can be made up of a single logical block address (LBA) or more than one LBA. As one of ordinary skill in the art will appreciate, logical block addressing is a scheme that can be used by a host for identifying a logical sector of data. For example, each logical sector can correspond to a unique logical block address (LBA). Additionally, an LBA may also correspond to a physical address. As an example, a logical sector of data can be a number of bytes of data (e.g., 256 bytes, 512 bytes, or 1,024 bytes). However, embodiments are not limited to these examples.

In one or more embodiments of the present disclosure, a number of LBAs can correspond to a logical page number (LPN). That is, an LPN can include a number of LBAs (e.g., a number of logical sectors of data). For example, one or more LPNs can map logically into one LBA, depending on the size of the LBA and/or LPN(s). Additionally, a virtual page number (VPN) can be used to identify the logical address (e.g., map the location) of data stored in a table, such as, for example, tables 232, 236, 242, 332, 438, and/or 542 further described herein in connection with FIGS. 2A-5. That is, a VPN can be the equivalent of an LPN for data stored in a table.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

Figure 2:
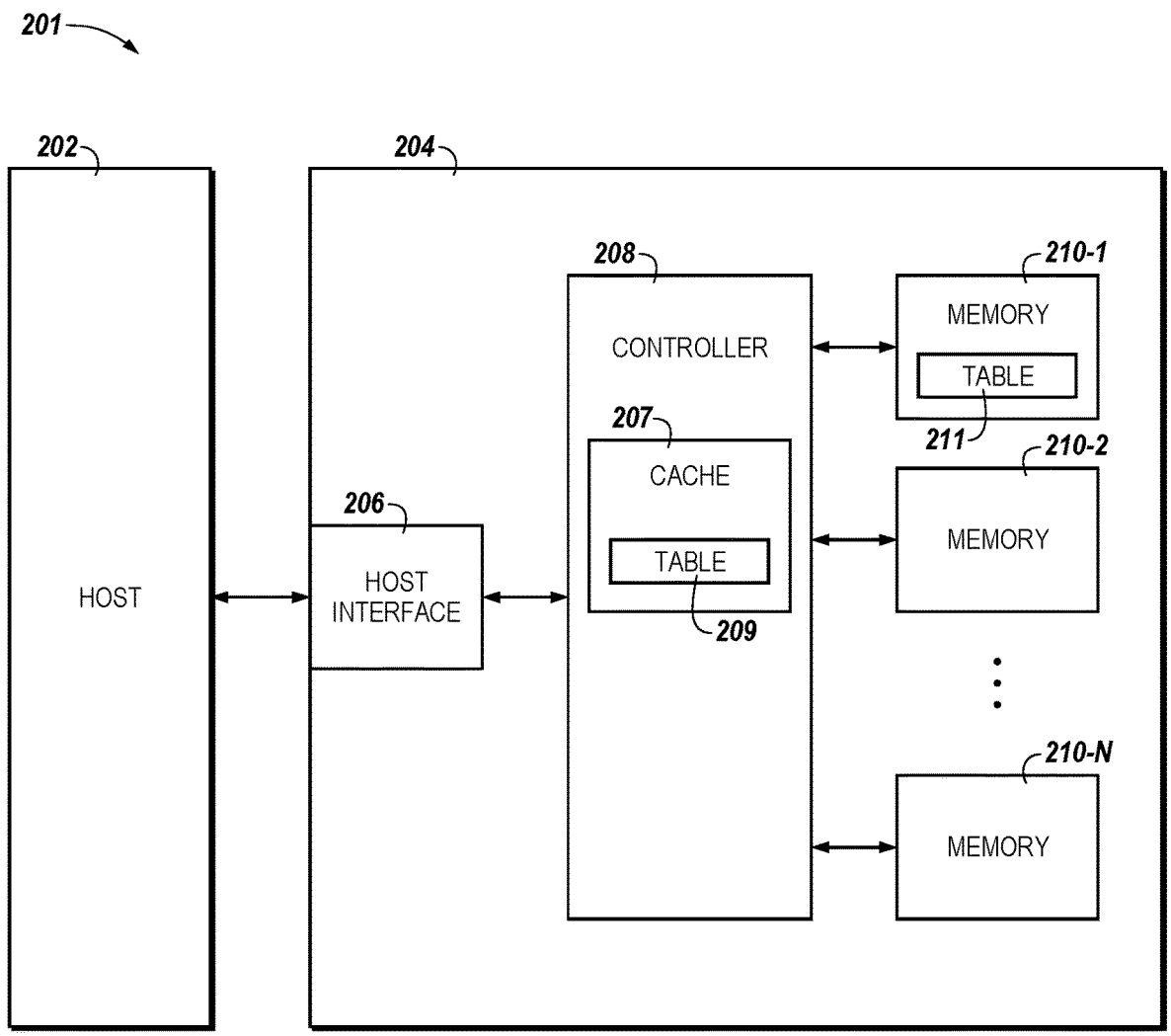
FIG. 2 is a block diagram of an apparatus in the form of a computing system comprising a memory system in accordance with a number of embodiments of the present disclosure.

FIG. 2 is a block diagram of an apparatus in the form of a computing system 201 comprising a memory system 204 in accordance with a number of embodiments of the present disclosure. As used herein, a memory system, controller, and/or memory device may separately be an "apparatus".

Memory system 204 can be, for example, a solid state drive (SSD). In the embodiment illustrated in FIG. 2, memory system 204 includes a host interface 206, a memory (e.g., a number of memory devices 210-1, 210-2, . . . , 210-N), and a controller 208 (e.g., an SSD controller) coupled to physical host interface 206 and memory devices 210-1, 210-2, . . . , 210-N.

Memory devices 210-1, 210-2, . . . , 210-N can include, for example, a number of non-volatile memory arrays (e.g., arrays of non-volatile memory cells). For instance, memory devices 210-1, 210-2, . . . , 210-N can include a number of memory arrays analogous to memory array 100 previously described in connection with FIG. 1. Memory device 210-1 can include a table 211 that is stored within memory device 210-1. In some embodiments, the table 211 can be an address mapping table that corresponds to all memory (e.g., memory devices 210-1, 201-2, . . . , 210-N) and includes logical to physical mapping of all memory.

In operation, data can be written to and/or read from a memory device of a memory system (e.g., memory devices 210-1, . . . , 210-N of memory system 204) as a page of data, for example. As such, a page of data can be referred to as a data transfer size of the memory system. Data can be transferred to/from a host 202) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 206 can be used to communicate information between memory system 204 and another device such as a host 202. Host 202 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

Host interface 206 can be in the form of a standardized physical interface. For example, when memory system 204 is used for information storage in computing system 201, host interface 206 can be a serial advanced technology attachment (SATA) physical interface, a peripheral component interconnect express (PCIe) physical interface, or a universal serial bus (USB) physical interface, among other physical connectors and/or interfaces. In general, however, host interface 206 can provide an interface for passing control, address, information (e.g., data), and other signals between memory system 204 and a host (e.g., host 202) having compatible receptors for host interface 206.

Controller 208 can include, for example, control circuitry and/or logic (e.g., hardware and firmware). Controller 208 can be included on the same physical device (e.g., the same die) as memories 210-1, 210-2, . . . , 210-N. For example, controller 208 can be an application specific integrated circuit (ASIC) coupled to a printed circuit board including physical host interface 206 and memories 210-1, 210-2, . . . , 210-N. Alternatively, controller 208 can be included on a separate physical device that is communicatively coupled to the physical device that includes memories 210-1, 210-2, . . . , 210-N. In a number of embodiments, components of controller 208 can be spread across multiple physical devices (e.g., some components on the same die as the memory, and some components on a different die, module, or board) as a distributed controller.

Controller 208 can include a cache 207 (e.g., a memory cache using DRAM or SRAM to store data) that stores a table 209. The table 209 can include at least a portion of an address mapping table. For example, the cache 207 can store one or more regions of an address mapping table (e.g., 211) loaded thereto. Regions of the address mapping table 211 can correspond to respective physical regions of the memory (e.g., 210-1 to 210-N) mapped by table 211 (described further below in association with FIG. 4).

Controller 208 can communicate with memory devices 210-1, 210-2, . . . , 210-N to sense (e.g., read), program (e.g., write), and/or erase information, among other operations. In addition, the controller 208 can communicate with memory devices 210-1, 210-2, . . . , 210-N to overwrite existing data with new data in contrast to erasing existing data. Controller 208 can have circuitry that may be a number of integrated circuits and/or discrete components. In a number of embodiments, the circuitry in controller 208 may include control circuitry for controlling access across memory devices 210-1, 210-2, . . . , 210-N and/or circuitry for providing a translation layer (e.g., a flash translation layer) between host 202 and memory system 204.

Controller 208 can control operation of a dedicated region, such as a block addressing portion, of each respective memory device 210-1, 210-2, . . . , 210-N as (e.g., configure a portion of each respective memory devices 210-1, 210-2, . . . , 210-N to operate as) a static (e.g., dedicated) single level cell (SLC) cache and/or a dynamic SLC cache. A static SLC cache refers to a cache that is not updated and data is not inserted into while the cache processes the transformation. Once a static cache is created, the cache is queried instead of the lookup table. A dynamic SLC cache refers to a cache that stores portions of data that can be updated or additional data inserted into the cache as the portions of data are accessed. For example, a portion of each respective memory device 210-1, 210-2, . . . , 210-N can be configured to operate as a static cache in SLC mode and/or a dynamic cache in SLC mode. This portion of each respective memory device 210-1, 210-2, . . . , 210-N can be, for example, a first plurality of blocks (e.g., physical blocks) of memory cells in each respective memory, as will be further described herein (e.g., in connection with FIG. 3), and may be referred to herein as a first portion of the memory. In addition, portions of each respective memory device 210-1, 210-2, . . . , 210-N can include a second plurality of blocks, a third plurality of blocks, etc.

The embodiment illustrated in FIG. 2 can include additional circuitry, logic, and/or components not illustrated so as not to obscure embodiments of the present disclosure. For example, memory device 204 can include address circuitry to latch address signals provided over I/O connectors through I/O circuitry. Address signals can be received and decoded by a row decoders and column decoders, to access memories 210-1, 210-2, . . . , 210-N. While specific circuitry is illustrated in this example, additional circuitry not described or illustrated can be included and used in the example.

Figure 3A:
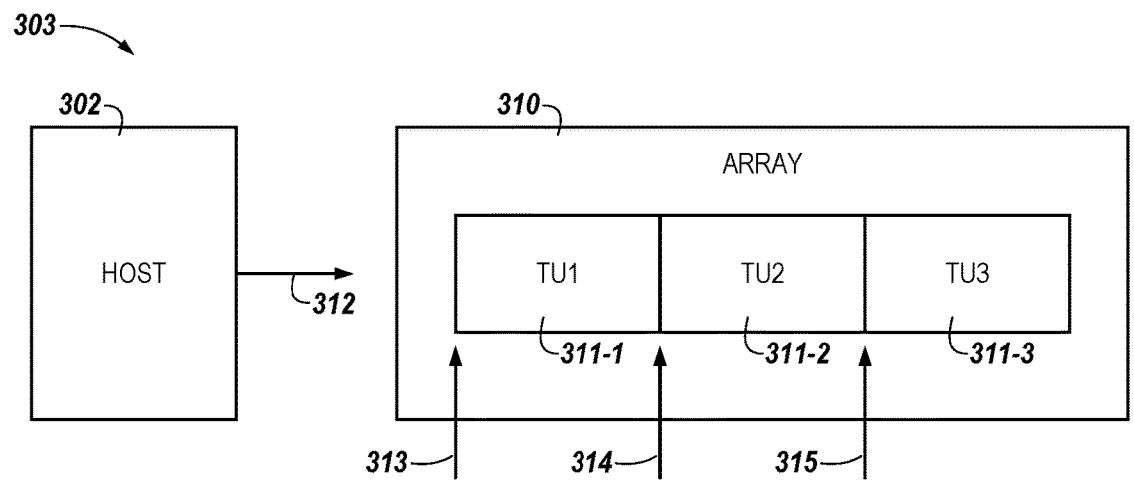
FIG. 3A illustrates a block diagram of an apparatus in the form of a host and an array of memory.

FIG. 3A illustrates a block diagram of an apparatus 303 in the form of a host and an array of memory. The host 302 can send data, illustrated by arrow 312, to an array 310 of memory cells. The array 310 of memory cells can include a number of groups of memory cells 311-1, 311-2, 311-3. The host 302 can send data in a sequential format to be written as portions of memory referred to herein as translation units (TUs). These TUs can be used as a management unit to more easily manage a particular amount of data in the physical memory. In some embodiments, these portions of memory can be any number of lengths. In some examples, a TU can be 4 KB in length. Each of the TUs can be associated with a group of memory cells in an array of memory. For example, a first TU (e.g., "TU1") can be associated with a first group of memory cells 311-1 and can start at a physical address location 313.

The host can write TUs in a sequential format into the array 310. For example, a first portion of data can be written as the first TU 311-1, a second portion of data can be written as a second TU (e.g., "TU2") 311-2, and a third portion of data can be written as a third TU (e.g., "TU3") 311-3 subsequent to writing to the second TU 311-2. The second portion of data can be written as the second TU 311-2 starting at physical address location 314 and the third TU 311-3 can be written starting at physical address location 315.

In some previous approaches, an address mapping table (such as table 209 in FIG. 2) can use a logical address as an index into the address mapping table that corresponds to each of the first to third TUs and the address mapping table can include a physical address entry that map to each of the indexed logical addresses. This could be referred to as a 1:1 correlation of logical to physical addresses. However, in association with embodiments described herein, a different correlation can be used to minimize an amount of physical space that the address mapping table is stored in. In order to achieve this correlation, an initial physical address location of sequentially written data can be entered and additional portions of data written subsequent to the physical address location can be entered based on offsets of each portion of data.

Figure 3B:
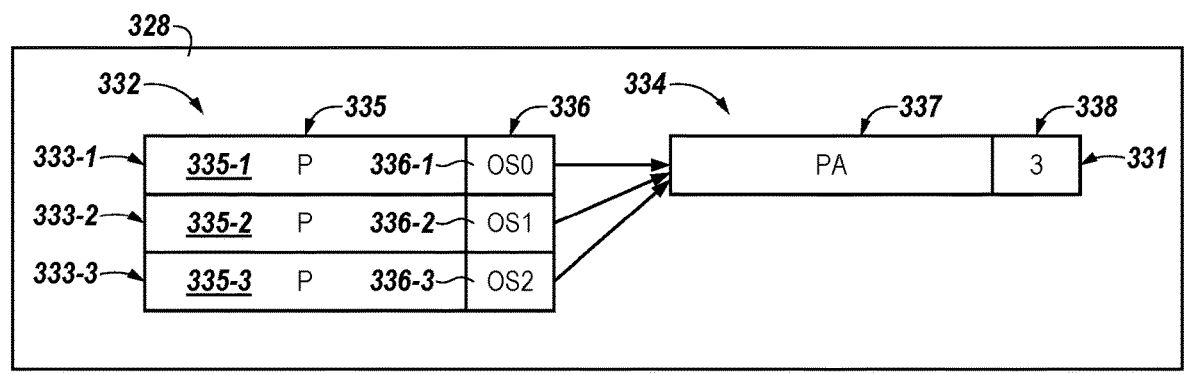
FIG. 3B illustrates a block diagram of an address mapping table in accordance with a number of embodiments of the present disclosure.

FIG. 3B illustrates a block diagram of an address mapping table 328 in accordance with a number of embodiments of the present disclosure. The address mapping table 328 illustrates entries corresponding to writing the translation units (TU1, TU2, TU3) illustrated in FIG. 3A. Specifically, the address mapping table 328 illustrates logical to physical address mapping of the translation units (TUs) within a memory array. Data being written as the TUs in an array can be written sequentially in larger chunks to increase efficiency, rather than writing in amounts of data smaller than a size of a TU. For example, a number of TUs can be written sequentially in chunks of four TUs, eight TUs, sixteen TUs, or more TUs at a time to the array. In order to take advantage of this sequential writing, and to minimize a size of the address mapping table, a first physical address of a page of the first TU written can be entered and subsequent TUs written can be associated with that first physical address with a corresponding offset to indicate how far from the first physical address the TU is written in a page of the array.

As illustrated in FIG. 3B, a first table 332 of the address mapping table 328 can be organized using an index to correspond to TU logical addresses. For example, the first entry 333-1 corresponds to a first TU (e.g., "TU1"), a second entry 333-2 corresponds to a second TU (e.g., "TU2"), a third entry 333-3 corresponds to a third TU (e.g., "TU3"), and so forth (as additional entries can be included in the first table 332, as illustrated further in FIG. 4). The entries 333-1, 333-2, 333-3 can include respective pointers 335-1, 335-2, 335-3 that point to a corresponding entry 331 in a second table 334 of the address mapping table 328. The entries 333-1, 331-2, 333-3 of the first table 332 can include respective offsets 336-1, 336-2, 336-3 that indicate a location, within a physical address range corresponding to an entry in the second table 334, at which the physical data corresponding to the respective TU is stored.

The second table 334 can include a number of entries 331 that correspond to a physical address range in a memory array (e.g., memory array 310 in FIG. 3A). The number of entries 331 each include a physical address field 337 and a count field 338. The physical address field 337 can indicate a physical address ("PA") at which corresponding data of a logical address is stored. The count field 338 can indicate a quantity of entries in the first table 332 that the entry 331 in the second table is associated with.

As a first portion of data is written as a first translation unit ("TU1") within an array (e.g., array 310), a first entry 333-1 corresponding to a first TU logical address associated with the first TU is updated in a first table 332. The updated first entry 333-1 in the first table 332 includes a pointer ("P") 335-1 that points to the entry 331 in the second table 334 (illustrated by an arrow) to indicate that the data of the first TU logical address is stored in the physical address range represented by the entry 331. A physical address (e.g., "PA") 337 indicates a starting point of a physical location of a first page in an array (e.g., array 310) where the first portion of data is written to. As the first portion of data is the first data written in a number of sequentially written portions in this example, an offset 336-1 (e.g., "OS 0") of zero is entered in the corresponding offset field 336. An offset of zero indicates that the corresponding TU is written to the array starting at the physical address location of the corresponding entry in the second table 334. For example, the entry 333-1 is associated with storing data as a first TU at PA 337. A count field 338 associated with the entry 331 is incremented by one (1) (resulting in a count field 338 value of 1, not illustrated) as the first entry 333-1 is associated, by pointer 335-1, with the entry 331. While the illustrated example describes writing each TU entry into the table one by one, examples are not so limited. For example, when one host command includes 4 TUs, all 4 TUs into the memory array can be updated in the first table and the second table at the same time.

As a second portion of data (e.g., "TU2") is physically written to the array sequentially after the first portion, a second entry 333-2 corresponding to a second TU logical address associated with the second portion is updated in the first table 332. A pointer 335-2 of the updated second entry 333-2 in the first table 332 is pointed to the entry 331 in the second table 334 (indicated by an arrow). The entry 333-2 of the first table 332 being pointed to the entry 331 in the second table indicates that the second portion is written to a physical address range associated with the entry 331. The second entry 333-2 includes an offset 336-2 of one (1) (e.g., "OS 1"). The offset 336-2 of one (1) indicates that the translation unit (TU2) associated with the second entry is offset, as physically written, by one translation unit length from the physical address ("PA") 337 location indicated in the entry 331 of the second table 334. A count field 338 associated with the entry 331 is incremented by one (1) (resulting in a count field 338 value of 2, not illustrated) as the second entry 333-2 is associated, by pointer 335-2, with the entry 331.

As a third portion of data (e.g., "TU3") is physically written to the array sequentially after the second portion, a third entry 333-3 corresponding to a third TU logical address associated with the third portion is updated in the first table 332. A pointer 335-3 of the updated third entry 333-3 in the first table 332 is pointed to the entry 331 in the second table 334 (indicated by an arrow). The entry 333-3 of the first table 332 being pointed to the entry 331 in the second table indicates that the third portion is written to a physical address range associated with the entry 331. The third entry 333-3 includes an offset 336-3 of two (2) (e.g., "OS 2"). The offset 336-2 of two (2) indicates that the translation unit (TU3) associated with the third entry is offset, as physically written, by two translation unit lengths from the physical address ("PA") 337 location indicated in the entry 331 of the second table 334. A count field 338 associated with the entry 331 is incremented by one (1) (resulting in a count field 338 value of 3, as illustrated in FIG. 3B) as the third entry 333-3 is associated, by pointer 335-3, with the entry 331.

In this way, the first, second, and third TUs (TU1, TU2, TU3) are written sequentially in memory cells of an array and an address mapping table 328 includes three entries 333-1, 333-2, 333-3 in a first table 332 corresponding to logical addresses and only a single entry in a second table 334 corresponding to physical addresses. By correlating more than one entry in the first table 332 with a single entry in the second table 334, a size of the address mapping table 328 can be minimized.

Figure 4:
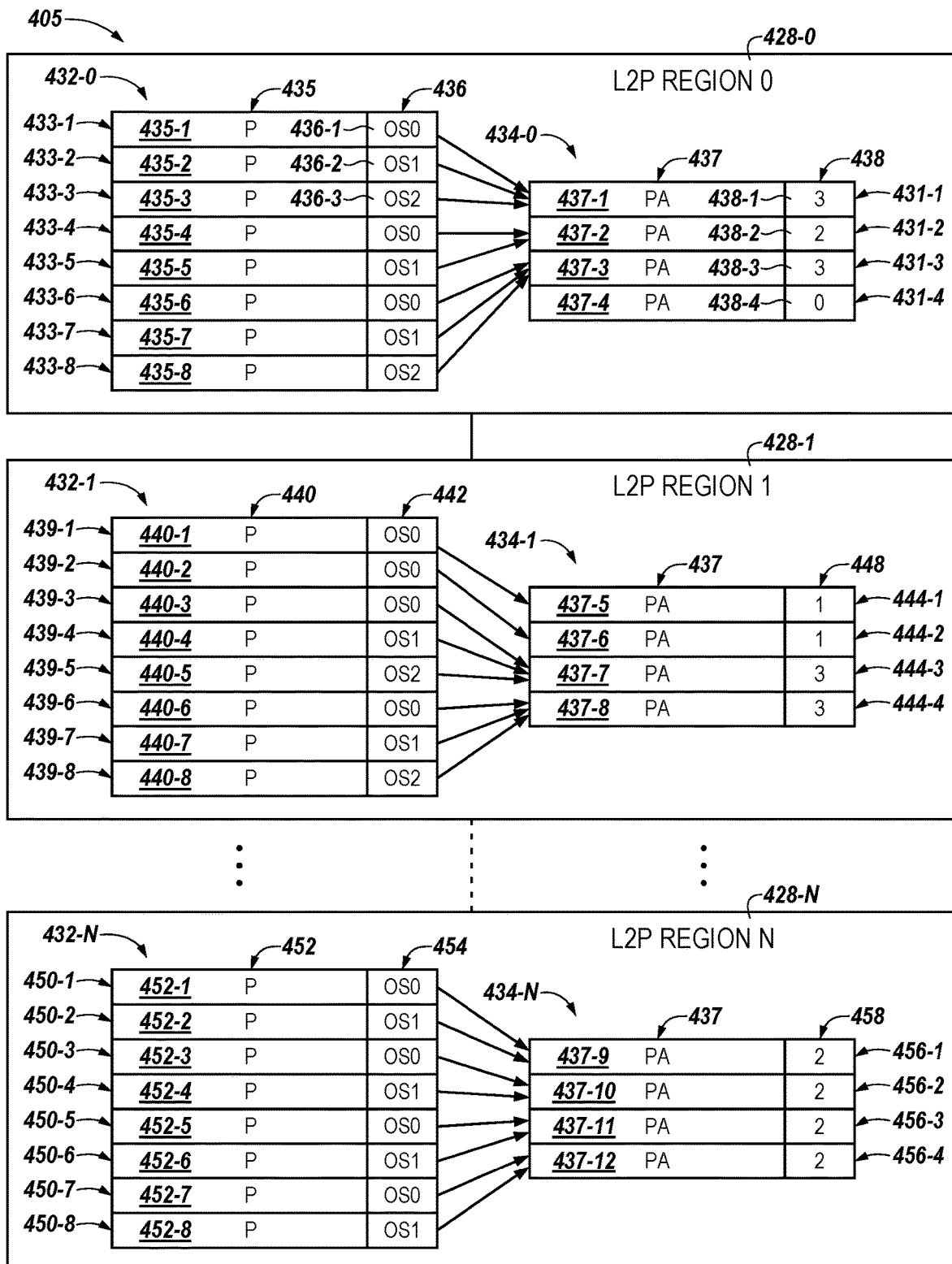
FIG. 4 illustrates a block diagram of an address mapping table in accordance with a number of embodiments of the present disclosure.

FIG. 4 illustrates a block diagram of an address mapping table 405 in accordance with a number of embodiments of the present disclosure. The address mapping table 405 can include a number of regions (logical to physical (L2P) mapping regions) of address mapping tables ("L2P Region 0, "L2P Region 1," . . . , "L2P Region N") 428-0, 428-1, . . . , 428-N. Each of the number of regions can correspond to a particular range of logical addresses (e.g., n number of logical addresses associated with n TUs) in a memory array (e.g., memory array 100 in FIG. 1). In some embodiments, each of the regions include a same n number of TUs that correspond to the respective region. A particular function can be performed on a value of a TU can be used to determine which region a particular address of a TU is located. As an example, a shift function can be performed on a value of a TU to determine the region the particular address of the TU is located. While, in this example, each of the regions of the address mapping table 405 includes eight (8) entries in a first table 432-0, 432-1, 432-2 and four (4) entries in a second table 434-0, 434-1, 434-2, embodiments are not so limited. As described below, an element number can indicate a number of elements as a group. For example, entries 433-1 to 433-8 can be referenced as entries 433 for ease of reference.

Each region ("L2P Region 0," "L2P Region 1," "L2P Region 2") 428-0, 428-1, . . . , 428-N can include a number of entries (433 for region 428-0; 439 for region 428-1; 450 for region 428-N) associated with a number of logical addresses of translation units (TUs) stored in a first table (tables 432). The entries 433, 439, 450 in the first tables 432 can include respective pointers (435, 440, and 452) that point to a corresponding entry in a second table (e.g., second tables 434, illustrated by arrows from entries of the first tables 432 to entries of the second tables 434). The first tables 432 can include an offset 436, 442, 454 that indicates an offset from a particular physical address in the corresponding entry in the second tables 434 that the entries of the offsets are pointed to. The second tables 434 of the respective regions 428 can include physical addresses 437. The second tables 434 can include a count field 438, 448, 458, respectively, that indicates a quantity of logical addresses of corresponding TUs that are associated with the particular entries 431, 444, and 456, respectively, of the second tables 434.

The first region ("L2P Region 0") 428-0 includes eight TUs that are written to an array in three different sequential groups. For example, a first sequential writing of data as a group of TUs includes writing a first TU that is indexed to be associated with entry 433-1, a second TU indexed to be associated with entry 433-2, and a third TU indexed to be associated with entry 433-3 to the array. The first TU can be written at a physical address 437-1 entered into entry 431-1 of the second table 434-0. As the first TU is written, the first entry 433-1 of the first table 432-0 is updated and a pointer 435-1 is pointed to the entry 431-1 in the second table 434-0. In addition, an offset 436-1 in the entry 433-1 is set to zero ("OS 0") to indicate that there is no offset from the physical address 437-1 at which the corresponding TU is physically. Further, the count field 438-1 in the entry 431-1 is set to 1 as this is the first TU associated with the entry 431-1.

As the second TU is written sequentially after the first TU is written, the second entry 433-2 of the first table 432-0 is updated and a pointer 435-2 is pointed to the entry 431-1 in the second table 434-0. In addition, an offset 436-2 in the entry 433-2 is set to one ("OS 1") and the count field 438-1 is incremented by 1 (to equal 2). A new entry in the second table 434-0 is not updated unless a non-sequential TU is written or the total physical space of the physical address range associated with the entry has been used. As the third TU is written sequentially after the second TU, the third entry 433-3 of the first table 432-0 is created and a pointer 435-3 is pointed to the entry 431-1 in the second table 434-0. In addition, an offset 436-3 in the entry 433-3 is set to two ("OS 2") and the count field 438-1 is incremented by 1 (to equal 3). While, in this example, the first, second, and third TUs are described as being updated one at a time, examples are not so limited. For example, the first, second, and third TU may be written sequentially and the updates to each of entries 433-1 to 433-3 and 431-1 can happen can be performed as a batch update.

Likewise, a second sequential group including a fourth and fifth TU can be written beginning at physical address 437-2, and the physical address 437-2 can be stored in entry 437-2. A fourth entry 433-4 is associated with the fourth TU written and a fifth entry 433-5 is associated with the fifth TU written subsequent to the fourth TU based on the indexing of the first table 432-0. A field count 431-2 of the entry 437-2 of the second table 434-0 includes a count of 2 as there are two TUs, and entries in the first table 432-0, associated with the entry 431-2. A third sequential group including a sixth, seventh, and eighth TU can be written sequentially beginning with a physical address of the array that is stored as physical address 437-3 in entry 437-3. A field count 431-3 of the entry 437-3 of the second table 434-0 includes a count of 3 as there are three TUs, and corresponding entries in the first table 432-0, associated with the entry 431-3.

While the description of this example describes creation of each entry as each TU is written, examples are not so limited. For example, a string of sequential TUs can be written and at the completion of the writing of that string, the entries, pointers, offsets, and count fields can be created and written to. As illustrated, the fourth entry 431-4 of the second table 434-0 is not associated with a written TU and corresponding entry in the first table 432-0. This is to illustrate that additional physical locations may be associated with that particular region but have not been physically written to with data yet. As will be described further below, additional insert and deletion operations can use and make available such extra physical space.

Likewise, a second region ("L2P Region 1") 428-1 includes eight TUs that are written to an array in four different sequential groups. For example, a first sequential writing of a group of TUs includes writing a first TU associated with entry 439-1 to a physical address in the array stored as physical address 437-5 in a second table 434-1 of the second region 428-1. A count field 448 associated with entry 444-1 includes a value of one. A second sequential writing of a group of TUs includes writing a second TU associated with entry 439-2 to a physical address in the array stored as physical address 437-6 in a second table 434-1 of the second region 428-1. A count field 448 associated with entry 444-2 includes a value of one. A third sequential writing of a group of TUs includes writing a third, fourth, and fifth TU associated with entries 439-3, 439-4, and 439-5, respectively, to a physical address range in the array associated with entry 444-2 and starting at physical address 437-7 in a second table 434-1 of the second region 428-1. A count field 448 associated with entry 444-3 includes a value of three as three TUs are associated with entry 444-3. A fourth sequential writing of a group of TUs includes writing a sixth, seventh, and eighth TU associated with entries 439-6, 439-7, and 439-8, respectively, to a physical address range in the array associated with entry 444-3 and starting at physical address 437-8 in a second table 434-1 of the second region 428-1. A count field 448 associated with entry 444-4 includes a value of three as three TUs are associated with entry 444-4.

Further, a third region ("L2P Region N") 428-2 includes eight TUs that are written to an array in four different sequential groups. For example, a first sequential writing of a group of TUs includes writing a first TU associated with entry 450-1 and a second TU associated with entry 450-2 to a physical address range associated with entry 456-1. The first TU is written starting at physical address 437-10, that is stored in entry 456-1, and the second TU is written sequential after that physical address 437-9. A count field 458 associated with entry 456-1 includes a value of two as the first TU and the second TU are both associated with the entry 456-1. A second sequential writing of a group of TUs includes writing a third TU associated with entry 450-3 and a fourth TU associated with entry 450-4 to a physical address range associated with entry 456-2 in the second table 434-N. The third TU is written starting at physical address 437-10, that is stored in entry 456-2, and the fourth TU is written sequential after that physical address 437-10. A count field 458 associated with entry 456-2 includes a value of two as the third TU and the fourth TU are both associated with the entry 456-2.

A third sequential writing of a group of TUs includes writing a fifth TU associated with entry 450-5 and a sixth TU associated with entry 450-6 to a physical address range associated with entry 456-3. The fifth TU is written starting at physical address 437-11, that is stored in entry 456-3, and the second TU is written sequential after that physical address 437-11. A count field 458 associated with entry 456-3 includes a value of two as the fifth TU and the sixth TU are both associated with the entry 456-3. A fourth sequential writing of a group of TUs includes writing a seventh TU associated with entry 450-7 and an eighth TU associated with entry 450-8 to a physical address range associated with entry 456-4 in the second table 434-N. The seventh TU is written starting at physical address 437-12, that is stored in entry 456-4, and the eighth TU is written sequential after that physical address 437-12. A count field 458 associated with entry 456-4 includes a value of two as the seventh TU and the eighth TU are both associated with the entry 456-4.

While this example illustrated in FIG. 4 shows up to three TUs per physical address entry in the corresponding second tables, examples are not so limited. In some examples, 16 or 32 TUs can be written sequentially in order and in those instances 16 or 32 TUs could be associated with a single physical address entry with a corresponding count field of 16 or 32 and 16 or 32 offsets associated with each of the TUs sequentially written. This ability to scale decreases an amount of physical space in a memory array that the address mapping table would be stored in. In this way, as memory drives increase to greater and greater sizes, the size of an address mapping table does not have to be prohibitive.

In some embodiments, an insert operation can be performed to insert additional entries into the second table of a region of an address mapping table. The insert operation can be performed in response to the host writing data to a TU that has not been written before. Subsequent to the insertion of the new entry in the second table, the updated entry in the first table associated with the newly written TU is pointed to the newly inserted entry in the second table. In some examples, the insert operation can be performed to insert a newly written TU into a location where a previously written TU has been trimmed out and no data is stored prior to writing the newly written TU. The insert operation can include creating a new entry in a second table (e.g., an address table such as table 434-0 in the first region 428-0 illustrated in FIG. 4) that will represent a physical address location that new data will be written to. The creation of the new entry can include determining a starting physical address where data is initially written to and a length of the data written. In response to the written data being longer than a length of a TU entry in the second table, an additional entry can be created and the written data can span a physical address range of a first entry in the second table and at least a portion of a physical address range of a second entry in the second table. The entries in a first table of the address mapping table (such as table 432-0 in FIG. 4) corresponding to the index number of the TUs being newly written can be pointed to the physical address in the newly created entry in the second table. A corresponding offset number can be entered in each of the entries to indicate where in the physical address range associated with the newly created entry in the second table that each respective TU is written.

In some embodiments, a replace operation can be performed in response to a host overwriting a previously valid TU with new data. In order to perform the replace operation, a new entry can be written to a second table (such as second table 434-0 in FIG. 4) that includes a physical address and a count field to indicate a quantity of TUs associated with the new entry. As the host overwrites the previously valid TU with additional TUs, entries in a first table (such as first table 432-0 in FIG. 4) corresponding to the additional TUs can be pointed to the new entry in the second table. Updating the first table, where each TU is represented in an indexed format, insures that data related to a particular indexed TU does not go stale and the current entry data remains valid.

In addition, the second table (e.g., second table 434-0) can be updated by revising a count field associated with the entry in the second table. For example, as the previously valid data is overwritten, the entry in the second table that the previously valid data pointed to becomes obsolete and the count field associated with that entry in the second table should be decremented by one. A count field of an entry in the second table reaching zero indicates that no entries in the first table (e.g., first table 432-0 in FIG. 4) point to the entry in the second table and that entry can be reused during a subsequent TU write. A count field is decremented during a write operation so that if a count field associated with an entry in the second table is decremented to zero, that entry can be used for the write operation and holes in the second table can be avoided. For example, if entry 431-4 had previously had a value of one in its corresponding count field 438-4, and the entry in the first table (e.g., table 432-0) previously associated with entry 431-4 was overwritten by data associated with a different physical address (and therefore different entry in the second table 434-0), the entry 431-4 would then be available for the new write operation to enter a new physical address and associate the newly written TU with.

However, holes in the second table may be created even though the method above is performed. For example, if two single commands are provided by the host to write two adjacent TUs, but they are not sequentially written and not pointed to the same physical address entry in the second table, there will be two physical address entries. If the host then sends a single command to write both of the adjacent TUs, overwriting the previously written data of those adjacent TUs, a single physical address entry in the second table will be associated with the two adjacent TUs. This can create one of the two physical address entries in the second table to have a count field of zero and this physical address entry may be in the middle of other physical address entries in the second table, creating a hole.

Furthermore, when a trim command is issued from the host an entry associated with each TU affected can be updated to indicate that the entry associated with the affected TU no longer points to any valid physical address. In one example, a particular number in the first table (e.g., first table 432-0 in FIG. 4) can indicate that a TU has no physical memory storing it. When the memory drive is first formatted and before any user data is written, the first table for all L2P regions could be loaded with this particular number value.

For example, when the trim command is received, for each affected TU, the first table can be updated to insert the particular number indicating no physical media backs this TU. In addition, a count field of an entry in the second table (e.g., second table 434-0 in FIG. 4) associated with the affected TU can be decremented. This method could also introduce holes in the second table, indicated by entries with a count field of zero. These holes in the second table can be addressed by leaving the hole in place and modify the sequences in the Insert and Replace operations described above to look for holes to reuse in the second table.

A first method to modify the sequences could be performed by sequential scanning of the second table to find a hole when a new entry needs to be written. The first modification method could be performed by storing a pointer pointing to a hole in the address stored across operations so that the hold can be easily identified and a scan for a hole in the entries does not necessarily start at the beginning of the second table. Additionally, each entry in the second table that has a count field of zero could be added to a particular list of entries that indicates which entry locations to use for additional writes. A head pointer in this list could be stored in its own unique location and a linked list of pointers could be stored in the corresponding entries of the second table. For example, a pointer in the linked list of pointers could point to a first free physical address entry in the second table and the physical address field in that entry then points to a next free entry, etc.

A second method to modify the sequences could be to, either immediately or at some later point in time when the number of holes passes a threshold, perform a compression operation. This compression operation, which would perform better in hardware than firmware, could scan through the second table and locate the holes (e.g., the entries with a count field of zero). For each hole located, the last row of the second table could be copied into the entry with a field count of zero. Then, update the first table (e.g., first table 432-0 in FIG. 4) entry that points to that row.

Figure 5:
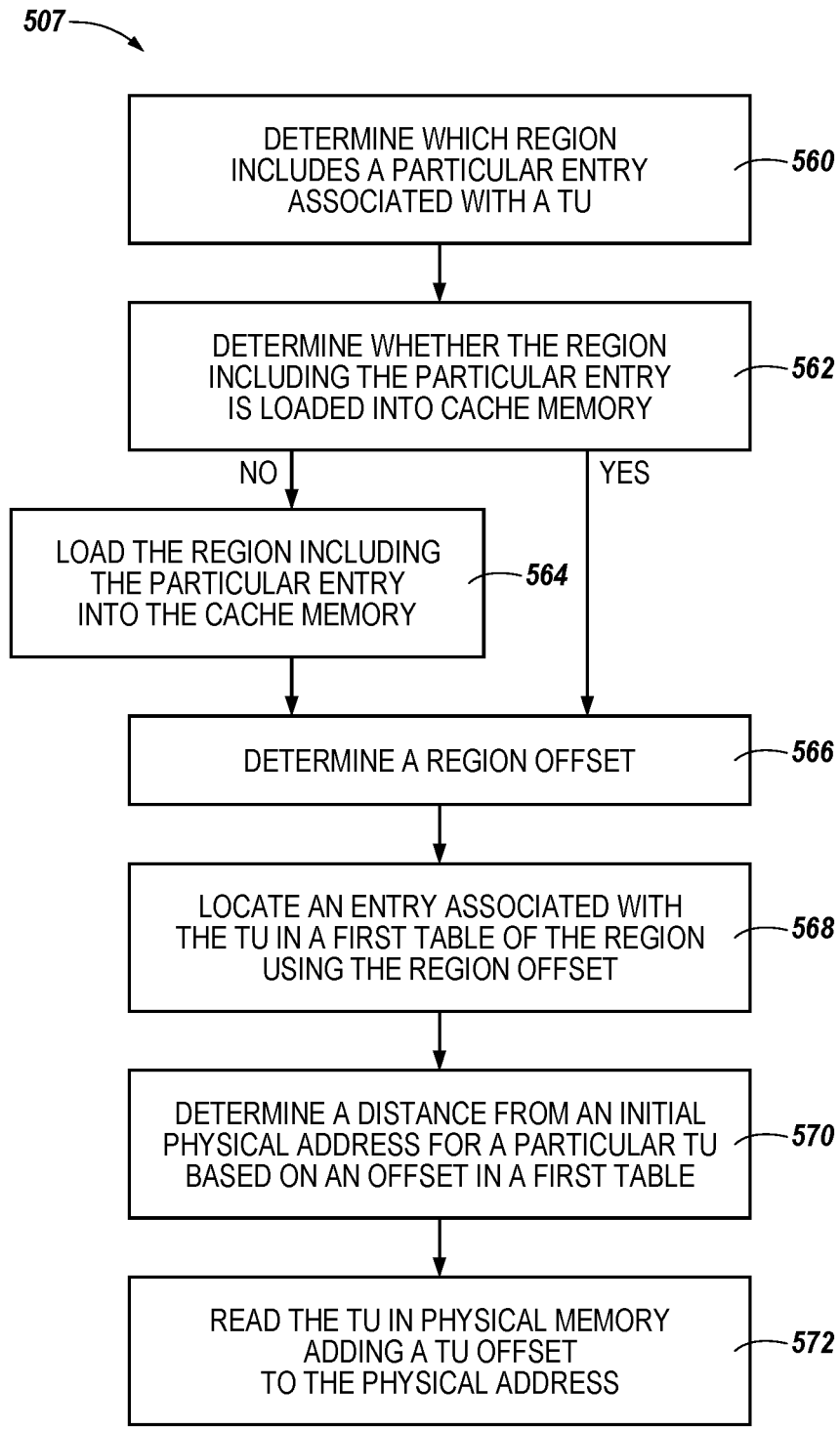
FIG. 5 illustrates a block diagram of method for memory addressing in accordance with a number of embodiments of the present disclosure.

FIG. 5 illustrates a block diagram of method 507 for memory addressing in accordance with a number of embodiments of the present disclosure. The method 507 refers to a look-up operation to locate data stored in a translation unit (TU) in physical memory. The method 507 can include, at step 560, determining which region (such as region 428-0 in FIG. 4), of an address mapping table, includes a particular entry (e.g., entry 433-1 in FIG. 4) associated with a TU (e.g., a first TU of a first region 428-0 in FIG. 4. Determining which region includes the TU can include performing a shift operation on the TU value. Each region can be associated with a particular number of logical address ranges (e.g., host addresses).

The method 507 can include, at step 562, determining whether the region including the particular entry is loaded into cache memory. This determination can include determining which regions are loaded into a cache memory and whether those loaded regions are the same as a region that includes the entry associated with the TU being located in physical memory. In response to the region not being loaded into the cache memory, the method 507 can include, at step 564, the region can be loaded from storage memory (e.g., DRAM) into the cache memory.

In response to the region being loaded into the cache memory, the method 507 can include, at step 466, determining a region offset. The region offset can be determined by subtracting a base TU address in the region from a target TU address associated with the TU. For example, the region offset can indicate how far from the base address that the target address is located. The method 507 can include, at step 468, locating an entry associated with the TU in a first table of the region using the region offset. The TU can be located in the region a particular distance from the base address using the determined region offset.

The method can include, at step 570, determining a distance from an initial physical address for a particular TU based on an offset in a first table. The offset in the first table can be in the located entry associated with the TU in the first table. If the TU being located is a first TU being written in a sequential string of TUs written together, the TU being located may be the same TU as the particular TU. However, if the TU to be located is not the first to be sequentially written, the particular TU would be the first in the sequence and the TU to be located would be offset from the particular TU by a particular distance. The particular distance can be indicated by an offset field (e.g., offset 436 in FIG. 4).

The method 507 can include, at step 572, reading the TU in physical memory by adding a TU offset to the physical address. The physical address of the TU can be determined using a pointer from an entry in a first table (e.g., table 432-0) that points to an entry in a second table (e.g., table 434-0) that includes a physical address location. The entry in the first table also includes an offset and that offset can be added to the physical address location in order to locate the TU in physical memory.

The physical memory footprint (e.g., amount of space used in physical DRAM memory) to store an address mapping table can be reduced by having the physical memory (e.g., DRAM) used to store a region of the address mapping table be of variable size. To do this, the physical memory can be managed for storing the regions as pool of variable sized objects, referred to as a heap in classic C/C++ terminology. Slab allocators and similar items can be used to avoid fragmentation and optimize the performance of the heap. An in-memory table can be used to track not only which regions are loaded in DRAM but where they are, down to the word level address of the region.

Methods to manage a growth size of region due to host writes can be performed. These methods can include allocating spare space between each region loaded in DRAM to allow for growth. These methods can include, when a region n needs additional space, removing the next region from the DRAM and storing the next region back to the physical media. These methods can include moving the region in memory via a DMA location to a new larger space. Regions of the address mapping table can be stored to the NAND and in some example caching schemes, each region can be sized to a size of a NAND page, or some binary multiple thereof. In these example caching schemes, the regions are of variable size so this relationship may no longer exist. To address this, the NAND could be used to store regions within and across NAND pages. However, a single region can be stored within a NAND page and additionally space at the end of the page can be left open.

In some memory applications, memory drives (such as solid state drives (SSDs)) are not run completely full. No user or filing systems can operate with zero free space and typically laptops and personal machines run with significant free space (e.g., 25-50%), and even in servers it can be difficult for their storage to be nearly full as that implies an impending out-of-storage space condition. Exceptions can include solid state drives (SSDs) that are used as tier zero cache devices in high end systems typically running 100% full at all times. Under filing systems when a drive is not 100% full, the data stored can be spread across the LBA range of the media, i.e. the data is not packed at the start of the drive but spread out with holes in between, which can minimize fragmentation of files. For a partially full drive, it could be expected that every region in the logical-to-physical (L2P) cache represents some valid TU, containing host data, and some that have been trimmed. However, the size of an L2P region in memory being independent of how much valid data it represents can limit advantages. This can be avoided in the embodiments described herein. While the first table can be a fixed size, the second table can vary in size depending on the quantity of actual user data stored. As an example, for a full drive, the size of each L2P region (including the first table and the second table) can be 12,641 bytes. For a drive only 50% full, the average physical address table can shrink in size from 6,089 bytes (when full and when not full but not able to decrease in size, in some previous approaches) to 3,045 bytes, or the total region size to 9,597 bytes, saving 40% of the DRAM space a fixed size region table would use.

In some embodiments, more DRAM accesses may be used than in some previous approaches (e.g., when not using the described address mapping table scheme described above). At a minimum, each host read of a single TU may use a read access to the first table and then a physical second table. For a write operation for a single TU, a minimum of 4 DRAM accesses, 2 reads and 2 writes, with potentially 3 writes if the entry in the physical second table cannot be reused can be performed. However, if the host reads TUs using a same large command size and alignment as when the TUs are written, the number of DRAM accesses can be reduced as n+1 reads can provide all information to read back n TUs. Further, if the sequential read is less than the number of TUs stored in the length field for each physical entry only one DRAM access may be used.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. An apparatus, comprising:
  an array of memory cells; and
  a memory cache configured to store at least a portion of
    an address mapping table comprising a number of regions corresponding to respective amounts of logical address space of the array, wherein the address mapping table maps translation units (TUs) to physical locations in the array, and wherein each one of the number of regions comprises:
a first table comprising entries corresponding to respective TU logical addresses of the respective amounts of logical address space;
wherein the entries of the first table comprise:
respective pointers to a particular entry in a second table; and
corresponding respective offsets indicating a location, within the physical address range corresponding to the particular entry in the second table, at which the physical data corresponding to the respective TU is stored.

2. The apparatus of claim 1, wherein the second table comprises entries corresponding to the respective physical address ranges of the array.

3. The apparatus of claim 1, wherein a quantity of the entries in the second table is less than a quantity of the entries in the first table.

4. The apparatus of claim 3, wherein the quantity of the entries in the second table varies in response to additional TUs being written and erased from the array.

5. The apparatus of claim 1, wherein a value of a respective count field associated with a first entry of the second table is decremented in response to at least one of the translation units previously associated with the first entry being subsequently associated with a second entry of the second table.

6. The apparatus of claim 1, wherein a value of a respective count field associated with a first entry of the second table is incremented in response to at least one of the translation units being associated with the first entry.

7. The apparatus of claim 1, wherein the array of memory cells is an array of NAND memory cells and the memory cache is a DRAM memory cache.

8. The apparatus of claim 1, wherein the first table is configured to store at least one respective pointer and offset using two bytes of data.

9. A method, comprising:
determining a physical location of a translation unit (TU) in an array of memory cells by:
accessing an entry corresponding to a logical address of the TU in a first table of an address mapping table, wherein the entry in the first table comprises:
a pointer to a respective entry in a second table of the address mapping table; and
an offset indicating a location within a physical address range indicated by the respective entry pointed to in the second table that the TU is stored.

10. The method of claim 9, further comprising accessing an entry corresponding to the physical address ranges in the second table, wherein the entry in the second table comprises a physical address field that indicates a first physical address of the physical address range.

11. The method of claim 9, further comprising accessing an entry corresponding to the physical address ranges in the second table, wherein the entry in the second table comprises a count field indicating a quantity of TUs associated with the physical address range corresponding to the entry in the second table.

12. The method of claim 9, comprising reading the TU in the array of memory cells at a distance from the first physical address in the array indicated by the offset.

13. The method of claim 9, comprising determining a region of a number of regions of an address mapping table that includes the entries in the first table and the second table corresponding to the TU, wherein respective regions correspond to amounts of logical address space of the array.

14. The method of claim 9, comprising, in response to writing a quantity of additional TUs to the array of memory cells:
writing a quantity of entries in the first table equal to the quantity of additional TUs written; and
writing an additional entry in the second table.

15. A system, comprising:
a memory device comprising an array of memory cells; and
a controller coupled to the memory device, wherein the controller is configured to perform operations comprising:
adding entries into a first table of an address mapping table of the memory device in response to additional TUs being written to the array; and
removing entries from the first table in response to corresponding TUs becoming invalid;
wherein the address mapping table comprises a number of regions that correspond to portions of the logical address space of the array and that each comprise:
the first table comprising entries corresponding to TU logical addresses, each entry comprising:
a pointer to a particular entry in a second table; and
an offset indicating a location at which the physical data corresponding to the respective TU is stored.

16. The system of claim 15, wherein the second table comprises entries corresponding to respective physical address ranges of the array and each entry comprises a physical address field indicating a first physical address of corresponding physical address range.

17. The system of claim 15, wherein the second table comprises entries corresponding to respective physical address ranges of the array and each entry comprises a count field indicating a quantity of TUs associated with a corresponding physical address range.

18. The system of claim 17, wherein the controller is configured to perform operations comprising using a physical address entry whose corresponding count field includes a zero as the available entry field to point the newly added entry in the first table to.

19. The system of claim 15, wherein the number of regions comprise variable sized regions.

20. The system of claim 19, wherein the controller is configured to perform operations comprising using a pool of variable sized objects to manage the variable sized table regions.

* * * * *